United States Patent Office 3,373,977
Patented Mar. 19, 1968

3,373,977
GRANULAR MATERIAL CONDITIONING APPARATUS
Harry W. Dietert, Kerrville, Tex., assignor to Harry W. Dietert Co., Detroit, Mich., a corporation of Michigan
Continuation-in-part of application Ser. No. 391,420, Aug. 24, 1964. This application June 10, 1966, Ser. No. 556,616
4 Claims. (Cl. 259—154)

ABSTRACT OF THE DISCLOSURE

Apparatus for mixing foundry sand and additives therefor, including a mixer for the foundry sand and additives, means for metering additives into the mixer, means for testing the final physical properties of the mixed foundry sand and additives in the mixer, and means for compensating the metering means in accordance with the final physical properties of the foundry sand and additives in the mixer and for the initial physical properties of the foundry sand, including the initial temperature and composition of the foundry sand.

---

This application is a continuation-in-part of copending patent application Ser. No. 391,420, filed Aug. 24, 1964, which is a continuation-in-part of application Ser. No. 259,069, filed Feb. 18, 1963, now Patent No. 3,168,926.

The invention relates to granular material conditioning and refers more specifically to structure for and a method of metering additives to a mixer for granular material and additives in accordance with properties of the granular material as it enters and leaves the mixer.

In the past granular material, such as foundry sand, has been conditioned by determining the need for additives in the sand through anlysis of a test specimen and subsequently adding the additives to the sand and mixing the sand and additives together. It has been the practice to add the additives to the sand manually as with buckets, measuring cups and the like.

Such methods of conditioning foundry sand are not suited to the large demand therefor of modern foundries. A considerably shortened sand conditioning cycle is needed. In addition, such methods are relatively inaccurate and are wasteful of the time of sand conditioning apparatus and operators therefor.

It is therefore one of the objects of the present invention to provide improved structure for conditioning granular material.

Another object is to provide structure for automatically determining from the properties of granular material and required quantity of additives to be added thereto for conditioning thereof to provide desired properties thereof and for metering the required quantity of additives to the granular material.

Another object is to provide structure for conditioning granular material comprising means for mixing granular material and additives, means for determining the properties of the granular material, means for metering a quantity of additives for the granular material in accordance with the determined properties thereof and for transferring the additives into the granular material in the mixing means.

Another object is to provide structure as set forth above wherein the properties of the granular material are determined after granular material and additives are mixed and determine the quantity of additives to be added to subsequent granular material.

Another object is to provide structure as set forth above wherein the properties of the granular material are determined before granular material and additives are mixed and determine the quantity of additives to be added to the granular material the physical properties of which are determined.

Another object is to provide an improved method of conditioning granular material.

Another object is to provide a method of conditioning granular material comprising determining the properties of the granular material, metering additives for addition to the granular material in accordance with the determined properties thereof and adding the metered additives to the granular material.

Other objects and features of the invention will become apparent as the description proceeds, especially when taken in conjunction with the accompanying drawings, illustrating a preferred embodiment of the invention, wherein:

FIGURE 1 is a diagrammatic representation of granular material conditioning structure constructed in accordance with the invention.

FIGURE 2 is a diagrammatic representation of a modification of the granular material conditioning structure illustrated in FIGURE 1.

FIGURE 3 is a diagrammatic representation of another modification of the granular material conditioning structure illustrated in FIGURE 1.

With particular reference to the figures of the drawings, one embodiment of the present invention will now be disclosed in detail.

The granular material conditioning structure 10 illustrated in FIGURE 1 includes the granular material handling apparatus 12 and the additive handling apparatus 14. Properties testing apparatus 16 and 18 are provided between the granular material handling apparatus 12 and the additive handling apparatus 14.

In operation granular material is passed into the mixer 20 which it is desired to condition to provide granular material having predetermined properties by means of addition of additives thereto from the additive handling apparatus 14. In accordance with the invention the initial properties of the granular material and the properties of conditioned granular material are determined and additives added to the granular material for mixing therewith in accordance with the determined properties of the granular material.

More specifically, the granular material handling apparatus 12 includes a storage bin 22 for receiving granular material, such as foundry sand or the like, from a foundry operation which may be of different composition and temperature so that it has varied physical properties, the batch hopper 24 for receiving batches of the granular material from the bin 22 and for passing the measured batches of granular material into the mixer 20. The granular material handling apparatus is completed by the mixer 20 which in the usual case includes mechanism 26 for mixing granular material placed therein on rotation thereof and motor means 28 for rotating the mechanism 26.

The additive handling apparatus 14 includes a storage bin 30 having stored therein granular material additives, such as bonding agent or the like, and structure 32 for feeding the additive from the additive storage bin 30 to the additive metering apparatus 34. The additive is weighed in the additive metering apparatus 34 and passed into the mixer 20.

More specifically, the additive feeding structure 32 includes a cylindrical bin 36 into which additive from the bin 30 is passed by additive conveyor means, such as a pneumatic hose 38. The bottom of the cylindrical bin 36 is formed by the rotatable disc 40 driven in rotation by the motor means 42. A camming member 44 is secured to the outside of the bin 36. The disc 40 has a diameter greater than the diameter of the bin 36 and means are provided in the bin 36, such as an opening 46 in one wall thereof, to permit ready flow of additive from the bin 36 onto the disc 40 radially outward of the bin 36. The camming member 44 extends from the bin to the outer periphery of the disc 40 and is inclined away from the direction of rotation of the disc 40.

Thus in operation, additives passed from the bin 30 through the conduit 38 into the bin 36 are passed onto the disc 40 radially outwardly of the bin 36. When the additive contacts the camming member 44 it is cammed off of the disc 40 into the metering apparatus 34. Starting and stopping of the disc 40 may be controlled by a master cycle timer or manually in conjunction with the conditioning of a batch of granular material in the mixer 20. The metering structure 34 includes the balance beam 48, the metering hopper 50, variably positioned counterweight 52, and the pneumatic conduit 54. As shown, the balance beam 48 is pivoted centrally about the pivot means 56, the weighing bucket 50 is positioned in a fixed position along the balance beam 48 on the pivot means 58, and the weight on the other end of the balance beam 48 is varied in accordance with the properties of the granular material determined by the properties testing apparatus 16 and 18.

The properties testing apparatus 16 and 18 are shown in block form only. Apparatus for testing, for example, the moldability of granular material from a mixer 20 and providing an electrical signal in accordance therewith and apparatus for determining the properties, such as temperature and composition of granular material and providing an electric signal in accordance therewith and for adjusting the weight on the balance beam 48 in accordance therewith are known and will therefore not be considered in detail herein. For details of such apparatus and for further details of additive feed structure 36, reference is made to Patent No. 3,168,926.

In overall operation of the granular material conditioning apparatus illustrated in FIGURE 1, granular material, such as foundry sand, is fed from the storage bin 22 into the batch hopper 24 and is subsequently dumped into mixer 20 where the batch of granular material is conditioned to provide granular material having predetermined properties. The weight of counterweight 52 supported on the balance beam 48 is set by hand at a minimum. The chains 51 and 49 are supported on the balance beam 48 in accordance with the properties of previously conditioned granular material from the mixer 20 and in accordance with the properties of the granular material from the storage bin 22 respectively, so that the weight hopper 50 will exactly balance the balance beam 48 when the additive in the hopper 50 is that necessary to condition the batch of granular material in the mixer 20 to provide the desired properties therefor.

Additive is transferred into the additive feeding structure 32 if sufficient additive is not already in the feeding structure 32 and the disc 40 is rotated to dump additive into the additive hopper 50. When the proper amount of additive is in the hopper 50 to balance the beam 48, the disc 40 is stopped, the hopper 50 is closed and the additive therein is blown through the pneumatic conduit 54 into the mixer 20.

The batch of granular material and additive are then mixed in the mixer 20 to provide a granular material having a predetermined green strength which green strength is measured by the properties testing apparatus 16 to aid in the setting of the chain 51 for the next conditioning cycle. The counterweight 52 is set by hand at a minimum weight reading as indicated above. The necessary correction in additive addition is made by the amount of chain hanging on the end of beam 48. The chain 51 adds or subtracts a limited amount to hold binder ddition at predetermined physical property level.

Thus it will be seen that in accordance with the invention there has been provided automatic structure for conditioning granular material in accordance with both the initial and final properties of granular material which is simple, economical and efficient. Granular material conditioning cycles are thus considerably shortened and control thereof is maintained within close limits.

Granular material conditioning structure 60 illustrated in FIGURE 2 is similar to the granular material conditioning apparatus illustrated in FIGURE 1 with the exception that the additive handling apparatus 62 has been substituted for the additive handling apparatus 14 of the granular material conditioning apparatus 10. The apparatus 60 includes the storage hopper 64 having a flexible discharge tube 66 secured over the open end 68 thereof within the cylindrical abutment pipe 70. A pair of pneumatic cylinders 72 and 74 are positioned adjacent the flexible discharge tube 66 and support piston and piston rod structures 76 and 78 having abutments 80 and 82 secured thereto for engaging the flexible tube 66 and measuring a predetermined volume of additive therebetween for dumping into chute 84 on the mixer 86.

In operation the abutments 80 and 82 are alternately moved into a position such as that of 82 shown in FIGURE 2 to pinch the flexible discharge tube 66 closed and thus measure a predetermined volume of additive in accordance with the distance separating the cylinders 72 and 74.

The cylinder 74 is attached to a threaded spindle 88 and is caused to move closer to or farther from the cylinder 72 on rotation of the motor 90. Motor 90 is rotated in direction and magnitude in accordance with the properties of granular material from mixer 86 as sensed by the properties testing apparatus 92. The volume of additive added to each batch of granular material in the mixer 86 may thus be automatically controlled.

The modified granular material conditioning structure 94 illustrated in FIGURE 3 is operable to continuously condition granular material. In the structure 94 granular material, such as sand from a foundry operation, is continuously deposited on the continuous belt 96 from the storage bin 98 therefor from which it is deposited in the mixer 100. The properties of the granular material in the mixer 100 are sensed by the properties testing apparatus 102 and an electrical signal which varies in accordance with the properties of the granular material in the mixer 100 is passed to the motor 104. Motor 104 is thus driven at a speed determined by the properties of the granular material in the mixer 100 to feed more or less additive from the rotating disc 106 by means of the cam member 108 secured to the bin 110. Again the additive is stored in the additive storage bin 112 and is passed to the additive feeding structure 114 through the pneumatic conduit 116.

While one embodiment of the present invention and modifications thereof have been considered in detail, it will be understood that other embodiments and modifications are contemplated. It is the intention to include all embodiments and modifications as are defined by the appended claims within the scope of the invention.

What we claim as our invention is:

1. Granular material conditioning apparatus comprising a mixer for mixing foundry sand and additives therefor, a foundry sand storage bin positioned over the mixer, a batch hopper positioned between the storage bin and mixer for receiving a batch of foundry sand to be transferred to the mixer, means for metering additives having a known composition into the foundry sand in the mixer including a balance beam centrally pivotally mounted, an additive hopper positioned on one end of the balance beam, means for transporting foundry sand additives from the additive hopper to the mixer, an additive storage bin for receiving stored foundry sand additives positioned above the additive hopper having an open bottom, a disc positioned beneath the bottom of the additive storage bin and extending radially outwardly therefrom and over the additive hopper, means for rotating the disc, means for permitting flow of foundry sand additives onto the radially outer portion of the disc, means for camming the foundry sand additives off of the radially outer portion of said disc over the additive hopper, and means for supplying foundry sand additives to the additive storage bin, and an adjustable weight positioned on the other end of the balance beam, means for determining the final physical properties other than weight of the mixed foundry sand and additives, and means for compensating the means for metering additives to the mixer in accordance with the final physical properties other than weight of the mixed foundry sand and additives and in accordance with the initial physical properties other than weight of the foundry sand to provide mixed foundry sand and additives having desired physical properties including means for adjusting the weight in accordance with the means for determining the final physical properties of the mixed foundry sand and additive in the mixer, in accordance with the temperature of the foundry sand in the storage bin therefor and in accordance with the composition of the foundry sand.

2. Granular material conditioning apparatus comprising a mixer for mixing foundry sand and additives therefor, a foundry sand storage bin positioned over the mixer, a batch hopper positioned between the storage bin and mixer for receiving a batch of foundry sand to be transferred to the mixer, means for metering additives having a known composition into the foundry sand in the mixer including a balance beam centrally pivotally mounted, an additive hopper positioned on one end of the balance beam, means for transporting foundry sand additives from the additive hopper to the mixer, an additive storage bin for receiving stored foundry sand additives positioned above the additive hopper having an open bottom, a disc positioned beneath the bottom of the additive storage bin and extending radially outwardly therefrom and over the additive hopper, means for rotating the disc, means for permitting flow of foundry sand additives onto the radially outer portion of the disc, means for camming the foundry sand additives off of the radially outer portion of said disc over the additive hopper, and means for supplying foundry sand additives to the additive storage bin, and an adjustable weight positioned on the other end of the balance beam, means for determining the final physical properties other than weight of the mixed foundry sand and additives, and means for compensating the means for metering additives to the mixer in accordance with the final physical properties other than weight of the mixed foundry sand and additives and in accordance with the initial physical properties other than weight of the foundry sand to provide mixed foundry sand and additives having desired physical properties including means for adjusting the weight in accordance with the means for determining the final physical properties of the mixed foundry sand and additive in the mixer.

3. Structure as set forth in claim 2 wherein one of the initial physical properties of the foundry sand is temperature of the foundry sand.

4. Structure as set forth in claim 2 wherein one of the initial physical properties of the foundry sand is composition of the foundry sand.

References Cited

UNITED STATES PATENTS

| 1,755,103 | 4/1930 | Davis | 177—116 X |
| 2,587,531 | 2/1952 | Saxe | 259—154 |
| 2,607,579 | 8/1952 | Noble | 177—164 |
| 2,622,438 | 12/1952 | Campbell | 177—171 X |
| 2,750,144 | 6/1956 | Beckwith | 177—70 |
| 2,765,160 | 10/1956 | Dietert et al. | 177—171 |
| 2,791,120 | 5/1957 | Dietert et al. | 73—94 |
| 2,863,191 | 12/1958 | Dietert et al. | 259—154 X |
| 2,968,463 | 1/1961 | Noble | 177—70 X |
| 3,000,065 | 9/1961 | Dietert et al. | 259—154 X |
| 3,170,677 | 2/1965 | Phister et al. | 259—154 X |
| 3,256,181 | 6/1966 | Zingg et al. | 259—154 X |

FOREIGN PATENTS 543,195    7/1957    Canada.

ROBERT S. WARD, JR., *Primary Examiner.*